Patented Mar. 29, 1949

2,465,472

UNITED STATES PATENT OFFICE 2,465,472

STABILIZED ETHYL CELLULOSE COMPOSITION

Walter D. Paist, Orange, N. J., assignor to Celanese Corporation of America, a corporation of Delaware No Drawing. Application December 21, 1944, Serial No. 569,272

1 Claim. (Cl. 106—181)

This invention relates to the preparation of thermoplastic molding compositions and relates more particularly to the preparation of stable thermoplastic molding compositions having a basis of cellulose ether such as ethyl cellulose.

An object of this invention is the preparation of improved cellulose ether molding compositions of increased stability and high resistance to the action of heat, light and other agencies which tend to produce color, brittleness and surface changes in said molded materials.

Another object of this invention is the preparation of stabilized ethyl cellulose or other stable cellulose ether compositions, employing stabilizing agents which do not of themselves materially affect the viscosity, heat stability or resistance to crazing or produce objectionable color in the molding compositions while exerting the desired color-stabilizing action.

Other objects of this invention will appear from the following detailed description.

Thermoplastic compositions having a basis of a cellulose ether, such as ethyl cellulose, which compositions are widely employed commercially for the preparation of molded articles, possess certain characteristics which impair their utility. For example, some molded ethyl cellulose compositions possess an inherent yellowish color even prior to molding while others frequently develop yellowish or yellowish-brown colors during processing operations. The latter is especially noticeable where the processing operations are accompanied by the use of heat.

Where some color is initially present in the ethyl cellulose compositions, it may bleach to a lighter shade, or even disappear, upon exposure to light rich in the ultra-violet portion of the spectrum. This characteristic of color instability makes a standardized or controlled application of such ethyl cellulose compositions quite difficult. Where, for example, a colorist is working with an ethyl cellulose composition which possesses some color initially, he may be able to match a particular shade to a known, colored standard without difficulty. However, on prolonged exposure of the colored composition to light, the latter will change in shade to a very noticeable degree due to a loss of some of the color initially present in the sample because of the bleaching action of the light. When working with a particular ethyl cellulose which develops some color on molding, or during other processing operations involving the use of heat, the color which is known to develop must be compensated for with care in order that the final molded product will have the exact shade which is desired. Even the slightest deviation from the desired molding conditions, such as, for example, a slight increase or decrease in the time or temperature of molding, will noticeably alter the shade. The use of many stabilizers has been proposed in order to overcome this tendency toward color instability.

The object of incorporating such stabilizing agents in the ethyl cellulose compositions is to minimize any changes in shade due to the action of light or heat where the ethyl cellulose possesses some color initially, or where the ethyl cellulose tends to develop some color when molded. Color stabilization methods presently employed are characterized by the fact that they effect a marked lowering in the viscosity, heat stability and/or resistance to crazing of the stabilized material, and by the fact that many of these materials of themselves impart an undesirable degree of color to the stabilized ethyl cellulose compositions. The application of stabilizing agents which do not possess these drawbacks would render thermoplastic molding compositions of ethyl cellulose much more useful and more widely applicable.

I have now discovered that thermoplastic molding compositions having a basis of a cellulose ether, such as ethyl cellulose, may be stabilized to a remarkable degree, and the color changes heretofore observed in such molding compositions on exposure to heat or light may be greatly minimized or even entirely eliminated. In accordance with my invention, these advantageous results may be achieved by incorporating in said ethyl cellulose compositions a polybasic aliphatic organic acid, or aliphatic esters of said polybasic aliphatic organic acids in which at least one carboxy group is free, before subjecting said compositions to molding operations at elevated temperature. Even more advantageous results are obtained by employing stabilizing agents comprising hydroxy-substituted polybasic aliphatic organic acids or esters thereof containing a free carboxy group. Not only do these novel stabilizing agents prevent the ethyl cellulose from developing an objectionable degree of color or becoming brittle when heat is applied, either during processing or during molding, but they also minimize crazing in the molded articles. This invention is also applicable to the preparation of film, foil, sheets, rods, tubes, and similar articles made by methods employing solvents and relatively much lower temperatures than prevail in molding, extrusion and like processes. For example, film and foil made by casting at room temperature may be exposed to high temperatures in use and therefore may beneficially have incorporated therein a heat stabilizer. Furthermore, I have found that these novel stabilizing agents are substantially inert with respect to the dyes, pigments, plasticizer and other materials which are normally incorporated in ethyl cellulose molding compositions, no undesirable side-reactions taking place between these components and said stabilizing agents.

The polybasic organic acid stabilizing agents which I have found to be especially suitable for use in preparing cellulose ether molding compositions are, for example, oxalic, succinic, malic, itaconic, aconitic, maleic, adipic and sebacic acid, but especially valuable results are obtained employing hydroxy-substituted, polybasic aliphatic organic acids such as, for example, tartaric acid, citric acid and aliphatic esters of these acids, as for example, mono-ethyl citrate and diethyl citrate. The esters of these acids, containing at least one free carboxy group impart the minimum of haze to clear, transparent ethyl cellulose compositions. The most advantageous results are obtained when employing citric acid as the stabilizing agent and in a small proportion, e. g. in amounts of from 0.01 to 5%, calculated on the weight of the ethyl cellulose present in the thermoplastic composition.

The citric acid, or other stabilizing agent, may be mixed with the ethyl cellulose when the latter is in flake form prior to colloidallization, or it may be dissolved or suspended in the plasticizers employed and the solution or suspension obtained combined with the ethyl cellulose, or it may be mixed with the volatile solvents in which the ethyl cellulose is dissolved if a solvent casting operation is employed as in the preparation of sheet materials by a casting operation. The stabilizing agent may also be added directly to the plastic mass while it is being converted or colloided at elevated temperature on hot rolls or in a suitable mill as, for example, a Banbury mixer or a Werner-Pfleiderer kneader.

The plasticizers which may be incorporated in the ethyl cellulose compositions may be present in amounts of from 0 to 50% or more on the weight of the ethyl cellulose present. Various plasticizers or combinations of plasticizers may be employed in order to impart particular properties to the composition such as the desired flow characteristics, resistance to water, oil or grease, flexibility, hardness, or other particular properties which may be important for certain applications of the cellulose ether composition. As examples of suitable plasticizers which may be employed, there may be mentioned dibutyl phthalate, tricresyl phosphate, triphenyl phosphate, or butyl-Cellosolve stearate. In addition to the plasticizers, the molding composition may also contain lubricants such as, for example, mineral oil in amounts of from 0 to 50% on the weight of the cellulose ether. The ethyl cellulose employed in this invention may have an ethoxyl value of 44 to 49%.

The incorporation of said stabilizing agents in the relatively small amounts mentioned yields a product of exceptional and outstanding color stability when said ethyl cellulose compositions are subjected to the action of heat or light. Furthermore, the incorporation of said stabilizing agents does not alter the properties of the ethyl cellulose composition with regard to impact strength, dimensional stability, or with regard to its resistance to crazing when exposed to light for considerable periods of time. The stabilizing effect which the incorporation of citric acid produces not only makes the ethyl cellulose less colored to begin with, since it minimizes the development of color on processing, but it also acts to stabilize any color present, thus making the treated material less subject to further changes in color and the matching of colors for permanence, i. e. color control, therefore becomes greatly simplified.

In order further to illustrate my invention but without being limited thereto, the following examples are given:

*Example I*

1 part by weight of citric acid is dissolved in about 20 parts of distilled water and mixed with 100 parts by weight of ethyl cellulose flakes of 45% ethoxyl. The flakes are dried, plastified with 15 parts by weight of dibutyl phthalate and then molded into discs at 200° C. for 15 minutes. The discs obtained are of a considerably lighter color than a similar ethyl cellulose composition molded under the same conditions without employing citric acid as the color stabilizer. The citric acid stabilized discs have a clear, lightly-tinted color, as indicated by a yellowness coefficient of .44, while the unstabilized molded disc has a yellow-brown color with yellowness coefficient of .64. This numerical expression of the yellowness coefficient is determined by taking the difference between the light transmission at 640 m$\mu$ and that at 440 m$\mu$, and dividing by that at 640 m$\mu$; the greater this coefficient, the greater the degree of color. Employing 0.5 part of citric acid in the above composition produces a molded disc having a yellowness coefficient of only .40.

*Example II*

To 100 parts by weight of ethyl cellulose flakes, of 46% ethoxyl, are added 15 parts by weight of dibutyl phthalate, 2 parts by weight of "Fractol A," a refined mineral oil, and 0.5 parts of citric acid, and the whole is colloidized on hot rolls at 150° C. for 30 minutes. The homogeneous plastic composition obtained is rolled into thin sheets, cooled and is then broken up to form a molding powder. The powder obtained is injection-molded employing a front cylinder temperature of 215° C. For more satisfactory observation, the composition is conveniently injection-molded into step samples, the molded object being a unit of a cross-section comprising a plurality of steps of decreasing thickness, the thickest section being about $\frac{3}{16}$" and the thinnest just under about $\frac{1}{16}$". The yellowness coefficient of the injection-molded samples is .29 while that of a like ethyl cellulose composition, but molded without citric acid present is .72 clearly indicating the very noticeable improvement in color stability which is achieved by incorporating citric acid in the composition as a stabilizing agent. When these samples are exposed in a "Fadeometer" for 100 hours, a very slight lightening of the color is observed. No change in shade is produced, however, on exposure at 80° C. for 11 days. Samples of a similar molded ethyl cellulose composition in which citric acid is omitted bleach out markedly on like "Fadeometer" exposure and darken badly on the prolonged exposure to an elevated temperature of 80° C.

*Example III*

An ethyl cellulose molding composition is prepared in accordance with the process of Example I, but 1.0 part by weight of diethyl citrate is employed as the stabilizing agent in place of the citric acid employed in the above example. When the composition obtained is molded into discs at 200° C. for 15 minutes, discs having a yellowness coefficient of .41 are obtained. Unstabilized discs develop a yellowness coefficient of .64 when molded under these time and temperature molding conditions.

*Example IV*

An ethyl cellulose molding composition comprising 100 parts by weight of ethyl cellulose (45.6% ethoxyl), 15 parts by weight of dibutyl phthalate, 2 parts of "Fractol A" and 0.5 part by weight of citric acid is colloidized in a Banbury mixer at 150° C. for 5 to 10 minutes. The plastic composition obtained is then injection molded into step samples, as described in Example II, employing a front cylinder temperature of 385° F. The samples obtained have a yellowness coefficient of only .13, while an unstabilized, citric acid free, ethyl cellulose composition prepared in the same way and molded under like conditions has a yellowness coefficient of .50. Exposure of the molded, stabilized samples in a "Fadeometer" for 100 hours produces only the very slightest bleaching on the color-stabilized ethyl cellulose and no darkening of the color is observed on exposure to a temperature of 80° C. for 11 days. Unstabilized ethyl cellulose compositions prepared in like manner undergo marked bleaching when exposed for a similar period in a "Fadeometer" and darken considerably after 11 days exposure to a temperature of 80° C.

While the color stabilizing action of citric acid or other aliphatic hydroxy-substituted polybasic organic acid, or esters thereof, is effective regardless of when the stabilizing agent is incorporated in the ethyl cellulose compositions, the stabilizing agent is most advantageously incorporated in the ethyl cellulose compositions, where heat is a factor in the processing operation, prior to, or directly upon the exposure of said compositions to elevated temperatures. The stabilizing agents of my invention act on exposure of the thermoplastic composition to heat in such a manner, as to actually prevent the formation of the undesired color.

It is to be understood that the foregoing detailed description is given merely by way of illustration and that many variations may be made therein without departing from the spirit of my invention.

Having described my invention, what I desire to secure by Letters Patent is:

A substantially color-stable molding composition resistant to color changes under the action of heat or light, comprising ethyl cellulose, dibutyl phthalate, refined mineral oil and, as color stabilizing agent, citric acid in an amount of from 0.01 to 5% by weight of the ethyl cellulose.

WALTER D. PAIST.

REFERENCES CITED

The following references are of record in the file of this patent:

UNITED STATES PATENTS

| Number | Name | Date |
|---|---|---|
| 1,836,264 | McBurney | Dec. 15, 1931 |
| 1,972,091 | Graves et al. | Sept. 4, 1934 |
| 2,000,927 | Crutchfield | May 14, 1935 |
| 2,190,285 | Grant et al. | Feb. 13, 1940 |
| 2,280,863 | Stern | June 9, 1942 |
| 2,286,041 | Stern | June 9, 1942 |
| 2,349,737 | Krieger | May 23, 1944 |
| 2,365,652 | Stern | Dec. 19, 1944 |
| 2,384,855 | Soday | Sept. 18, 1945 |